(12) United States Patent
Zhang et al.

(10) Patent No.: US 8,346,005 B2
(45) Date of Patent: Jan. 1, 2013

(54) SYSTEM AND METHOD FOR "BOKEH-AJI" SHOT DETECTION AND REGION OF INTEREST ISOLATION

(75) Inventors: Ximin Zhang, San Jose, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 707 days.

(21) Appl. No.: 12/566,445

(22) Filed: Sep. 24, 2009

(65) Prior Publication Data

US 2011/0069884 A1   Mar. 24, 2011

(51) Int. Cl.
 *G06K 9/40* (2006.01)
(52) U.S. Cl. ....................................................... 382/255
(58) Field of Classification Search .................. 348/345, 348/E5.045; 375/E7.182; 382/255, 263; 715/802
See application file for complete search history.

(56) References Cited

U.S. PATENT DOCUMENTS 7,302,096 B2 *  11/2007  Kim .............................. 382/173
2010/0119157 A1 *  5/2010  Kameyama .................... 382/195

\* cited by examiner

*Primary Examiner* — Gregory F Cunningham
(74) *Attorney, Agent, or Firm* — Haverstock & Owens LLP (57) ABSTRACT

A "Bokeh-Aji" image is one in which the region of interest is in focus and the background is out of focus. Detection of "Bokeh-Aji" type images and then isolation to the region of interest area in a low complexity way without any human intervention is beneficial. A set of tools for performing this task include SAD and high pass filtering based in-focus/out-of-focus area separation, in-focus/out-of-focus block distribution based "Bokeh-Aji" shot detection and region of interest isolation. By effectively integrating these tools together, the "Bokeh-Aji" images are successfully identified, and the region of interest area is successfully isolated.

21 Claims, 5 Drawing Sheets

SYSTEM AND METHOD FOR "BOKEH-AJI" SHOT DETECTION AND REGION OF INTEREST ISOLATION

FIELD OF THE INVENTION

The present invention relates to the field of image processing. More specifically, the present invention relates to isolating a region of interest in an image with an out-of-focus background.

BACKGROUND OF THE INVENTION

Automatic image segmentation or segment isolation is a challenging problem. Assuming sharply focused regions contain adequate high frequency components, it is possible to distinguish the focused regions from the unfocused image by comparing the amount of the high frequency content. Two approaches for the segmentation of images include edge-based and region-based approaches. The edge-based method extracts the boundary of the object by measuring the amount of defocus at each edge pixel.

The region-based segmentation algorithms rely on the detection of the high frequency areas in the image. Several methods have been used, such as spatial summation of the squared anti-Gaussian (SSAG) function, variance of wavelet coefficients in the high frequency bands, a multi-scale statistical description of high frequency wavelet coefficients and local variance. Using high frequency components alone often results in errors in determining both in focused and defocused regions.

SUMMARY OF THE INVENTION

A "Bokeh-Aji" image is one in which the region of interest is in focus and the background is out of focus. Detection of "Bokeh-Aji" type images and then isolation to the region of interest area in a low complexity way without any human intervention is beneficial. A set of tools for performing this task include SAD and high pass filtering based in-focus/out-of-focus area separation, in-focus/out-of-focus block distribution based "Bokeh-Aji" shot detection and region of interest isolation. By effectively integrating these tools together, the "Bokeh-Aji" images are successfully identified, and the region of interest area is successfully isolated.

In one aspect, a method implemented on a device comprises determining if an image includes an in-focus region of interest and an out-of-focus background using a processor and isolating the in-focus region of interest using the processor. Determining if the image includes the in-focus region of interest and the out-of-focus background further comprises calculating a Sum of Absolute Differences (SAD) of each block of an image, at the same time, high pass filtering the image to obtain a high pass filter image, calculating block activity for each block in the high pass filter image, attributing each block to one of three categories: an in-focus block, an out-of-focus block and a neutral block and deciding if the image includes the in-focus region of interest and the out-of-focus background based on the distribution of the three categories of blocks. Deciding if the image includes the in-focus region of interest and the out-of-focus background further comprises counting a first total amount of in-focus blocks, counting a second total amount of out-of-focus blocks, comparing the first total amount of the in-focus blocks to a first threshold, comparing the second total amount of the out-of focus blocks to a second threshold, comparing the first total amount of the in-focus blocks to a third threshold, if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image. Isolating the in-focus region of interest further comprises extracting a location centroid of the in-focus region, calculating a mean value of a horizontal location and a vertical location of in-focus blocks, generating a center of an initial bounding box using one-third-rule based adjustment, generating a rectangle bounding box to contain the in-focus region, extracting an out-of-focus background, removing the out-of-focus background area within the bounding box and utilizing an adjusted bounding box area as the region of interest. Removing the out-of-focus background further comprises separating the bounding box into sub-boxes, counting the in-focus blocks within each sub-box of the sub-boxes, selecting candidate sub-boxes, denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box and generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a method of isolating a region of interest implemented on a device comprises determining using a processor if an image includes an in-focus region of interest and an out-of-focus background further comprising calculating a Sum of Absolute Differences (SAD) of each block of an image, at the same time, high pass filtering the image to obtain a high pass filter image, calculating block activity for each block in the high pass filter image, attributing each block to one of three categories: an in-focus block, an out-of-focus block and a neutral block and deciding if the image includes the in-focus region of interest and the out-of-focus background based on the distribution of the three categories of blocks and isolating the in-focus region of interest using the processor. Deciding if the image includes the in-focus region of interest and the out-of-focus background further comprises counting a first total amount of in-focus blocks, counting a second total amount of out-of-focus blocks, comparing the first total amount of the in-focus blocks to a first threshold, comparing the second total amount of the out-of focus blocks to a second threshold, comparing the first total amount of the in-focus blocks to a third threshold, if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image. Isolating the in-focus region of interest further comprises extracting a location centroid of the in-focus region, calculating a mean value of a horizontal location and a vertical location of in-focus blocks, generating a center of an initial bounding box using one-third-rule based adjustment, generating a rectangle bounding box to contain the in-focus region, extracting an out-of-focus background, removing the out-of-focus background area within the bounding box and utilizing an adjusted bounding box area as the region of interest. Removing the out-of-focus background further comprises separating the bounding box into sub-boxes, counting the in-focus blocks within each sub-box of the sub-boxes, selecting candidate sub-boxes, denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box and generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a system for isolating a region of interest implemented on a device comprises a sum of absolute differences extraction module for computing a sum of absolute differences for each block in an image using a processor, a high pass filtering module for applying high pass filtering to pixels in each of the blocks, a block activity extraction module for calculating the block activity for each of the blocks, a block categorization module for categorizing each of the blocks, a distribution based shot detection module for determining a distribution of the blocks and a region of interest isolation module for isolating the region of interest of the image based on the distribution of the blocks. The distribution based shot detection module is further configured for counting a first total amount of in-focus blocks, counting a second total amount of out-of-focus blocks, comparing the first total amount of the in-focus blocks to a first threshold, comparing the second total amount of the out-of focus blocks to a second threshold, comparing the first total amount of the in-focus blocks to a third threshold, if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image. The region of interest isolation module is further configured for extracting a location centroid of the in-focus region, calculating a mean value of a horizontal location and a vertical location of in-focus blocks, generating a center of an initial bounding box using one-third-rule based adjustment, generating a rectangle bounding box to contain the in-focus region, extracting an out-of-focus background, removing the out-of-focus background area within the bounding box and utilizing an adjusted bounding box area as the region of interest. Removing the out-of-focus background further comprises separating the bounding box into sub-boxes, counting the in-focus blocks within each sub-box of the sub-boxes, selecting candidate sub-boxes, denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box and generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In yet another aspect, a camera device for isolating a region of interest comprises an image acquisition component for acquiring an image, a memory for storing an application, the application for determining if an image includes an in-focus region of interest and an out-of-focus background and isolating the in-focus region of interest and a processing component coupled to the memory, the processing component configured for processing the application. Determining if the image includes the in-focus region of interest and the out-of-focus background further comprises calculating a Sum of Absolute Differences (SAD) of each block of an image, at the same time, high pass filtering the image to obtain a high pass filter image, calculating block activity for each block in the high pass filter image, attributing each block to one of three categories: an in-focus block, an out-of-focus block and a neutral block and deciding if the image includes the in-focus region of interest and the out-of-focus background based on the distribution of the three categories of blocks. Deciding if the image includes the in-focus region of interest and the out-of-focus background further comprises counting a first total amount of in-focus blocks, counting a second total amount of out-of-focus blocks, comparing the first total amount of the in-focus blocks to a first threshold, comparing the second total amount of the out-of focus blocks to a second threshold, comparing the first total amount of the in-focus blocks to a third threshold, if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image. Isolating the in-focus region of interest further comprises extracting a location centroid of the in-focus region, calculating a mean value of a horizontal location and a vertical location of in-focus blocks, generating a center of an initial bounding box using one-third-rule based adjustment, generating a rectangle bounding box to contain the in-focus region, extracting an out-of-focus background, removing the out-of-focus background area within the bounding box and utilizing an adjusted bounding box area as the region of interest. Removing the out-of-focus background further comprises separating the bounding box into sub-boxes, counting the in-focus blocks within each sub-box of the sub-boxes, selecting candidate sub-boxes, denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box and generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

DETAILED DESCRIPTION OF THE PREFERRED EMBODIMENT

"Bokeh-Aji" refers to an image with a region of interest in focus and a background out of focus.

Figure 1:
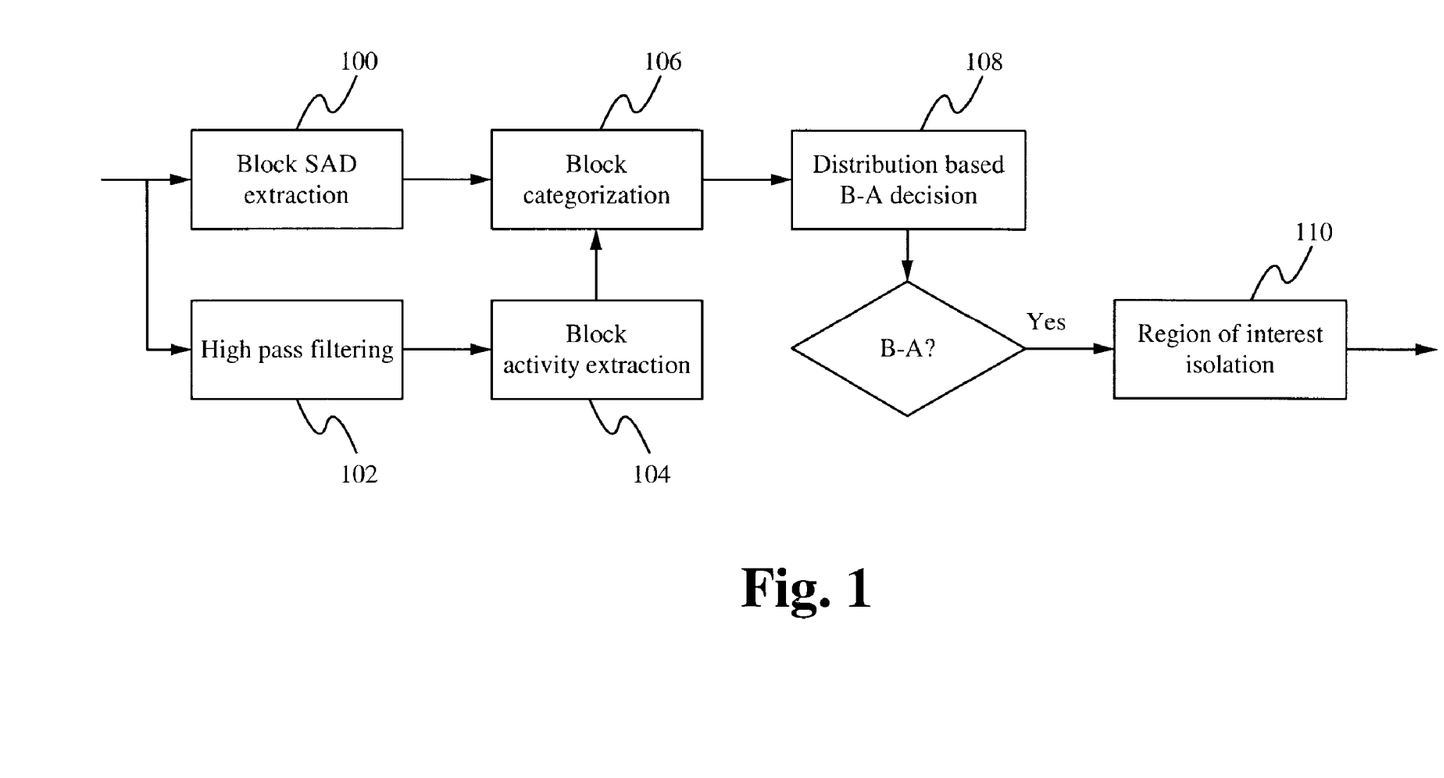
FIG. 1 illustrates a flowchart of a method of "Bokeh-Aji" shot detection according to some embodiments.

FIG. 1 illustrates a flowchart of a method of "Bokeh-Aji" shot detection according to some embodiments. For an input image, the Sum of Absolute Differences (SAD) of each 8×8 block is calculated, in the step 100. Although an 8×8 block is described, the block size is able to be any appropriate block size. At the same time, high pass filtering is applied to the image to obtain a high pass filter image, in the step 102. The block activity is calculated for each 8×8 block in the high passed image, in the step 104. By using the high passed image block activity and the original image block SAD, each block is attributed to one of three categories: an in-focus block, an out-of-focus block and a neutral block, in the step 106. Based on the distribution of the above three category blocks, a decision is made if the image is a "Bokeh-Aji" shot, in the step 108. If the image is determined as a "Bokeh-Aji" shot, the processing continues to region of interest isolation based on the distribution of the in-focus block, in the step 110. If the image is determined to not be a "Bokeh-Aji" shot, then the region of interest isolation does not occur.

Block SAD Extraction

As described, in the step 100, each 8×8 block is processed by SAD extraction. In block SAD extraction, the luminance block mean is first calculated. P(i,j) denotes the luminance pixel value, and the mean is calculated as:

$$Mean = \frac{1}{64} \sum_{i=0,j=0}^{i=7,j=7} P(i, j)$$

Then, the SAD is able to be calculated as:

$$SAD_{original} = \sum_{i=0,j=0}^{i=7,j=7} \left| P(i, j) - \frac{1}{64} \sum_{i=0,j=0}^{i=7,j=7} P(i, j) \right|$$

As described previously, although an 8×8 block is described herein, any size block is able to be used, and the equations will be adjusted accordingly.

High Pass Filtering

In the step 102, high pass filtering is applied to each luminance pixel except for the pixels in boundary blocks. P(i, j) denotes the luminance pixel value and is applied as:

$$P_{highpass}(i,j)=4*P(i,j)-P(i-1,j)-P(i+1,j)-P(i,j-1)-P(i,j+1)$$

$8 \leq j <$ width$-8, 8 \leq i <$ height$-$height$/4$.

Block Activity Extraction

In the step 104, block activity is calculated for each 8×8 block in the high passed image as follows:

$$BK_{activity} = \sum_{i=0,j=0}^{i=7,j=7} P_{highpass}(i, j)$$

Block Categorization

In the step 106, all of the blocks except for the boundary blocks are categorized into in-focus blocks, out-of-focus blocks or neutral blocks as follows:

$Class_{BK} =$ $$\begin{cases} \text{in-focus} & \text{if } SAD_{original} \geq 256 \text{ and } SAD_{original} < BK_{activity} \\ \text{out-of-focus} & \text{if } SAD_{original} \geq 256 \text{ and } SAD_{original} > 2*BK_{activity} \\ \text{Neutral} & \text{Otherwise} \end{cases}$$

After block categorization of the whole image, decisions are made regarding the Bokeh-Aji (B-A) shot detection.

Distribution-Based Bokeh-Aji Shot Decision

In the step 108, although the Bokeh-Aji shot is able to have almost unlimited variations, generally, in-focus blocks, out-of-focus blocks and neutral blocks follow some simple rules.

Figure 2:
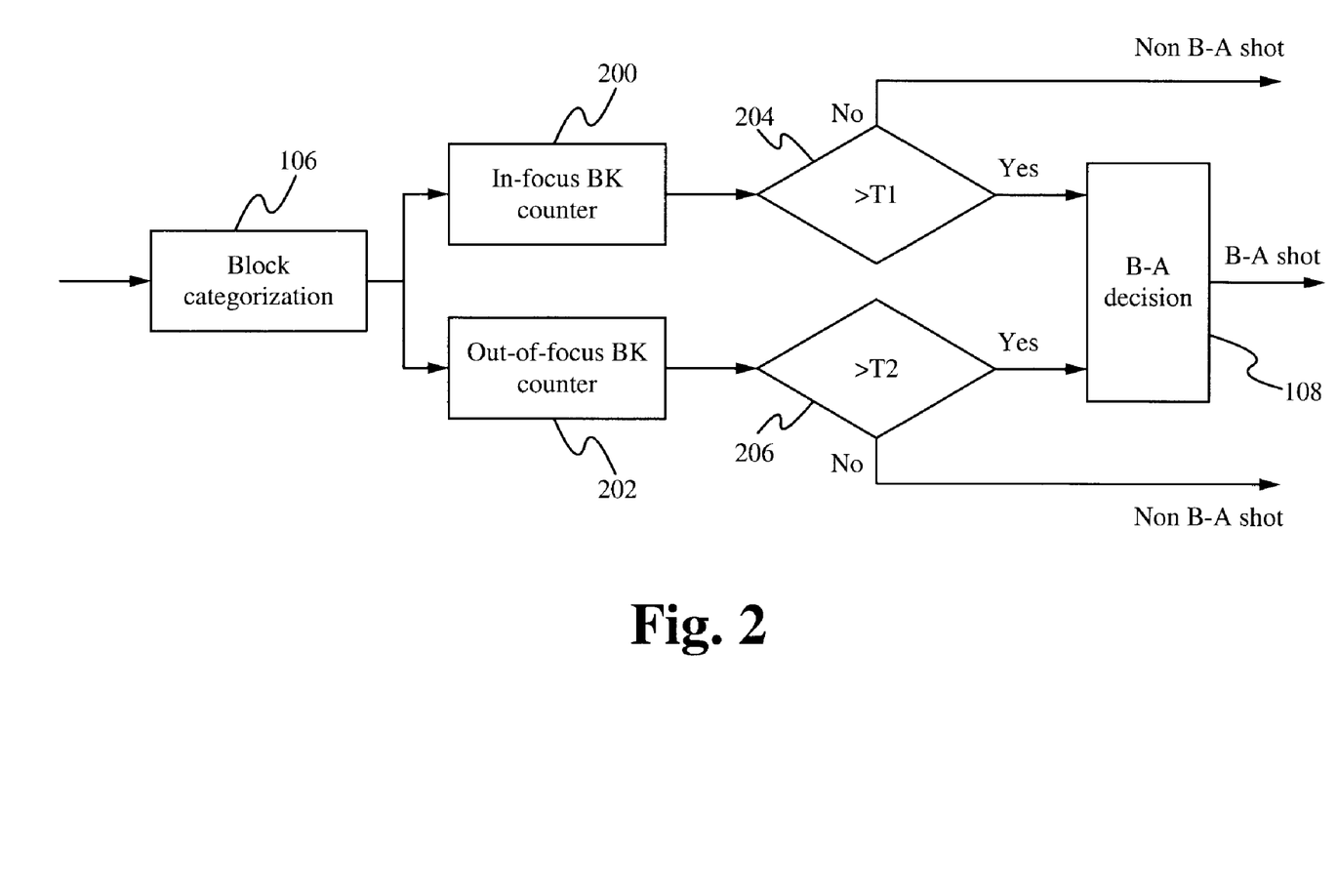
FIG. 2 illustrates a flowchart of a method of distribution based "Bokeh-Aji" decision according to some embodiments.

FIG. 2 illustrates a flowchart of a method of distribution based "Bokeh-Aji" decision according to some embodiments. As described, the blocks are categorized in the step 106. In the step 200, the total amount of in-focus blocks $C_I$ are counted, and in the step 202, the total amount of out-of-focus blocks $C_O$ in the image are counted. In the step 204, the total amount of in-focus blocks $C_I$ are compared to a threshold T1. If $C_I$ is larger than T1, then $C_I$ is used in the B-A decision, in the step 108. Otherwise, the current image is detected as a non-Bokeh-Aji image. In some embodiments, T1 is an image size adaptive threshold. T1 is able to be calculated as:

$$T1 = k_1 * \min(\text{width,height})$$

where $k_1$ is a parameter obtained through intensive empirical testing, and width and height denote the image width and height.

In the step 206, the total amount of out-of-focus blocks $C_O$ are compared to a threshold T2. If $C_O$ is larger than T2, $C_O$ is used in the B-A decision, in the step 108. Otherwise, the current image is detected as a non-Bokeh-Aji image. In some embodiments, T2 is an image size adaptive threshold. T2 is able to be calculated as:

$$T2 = k_2 * \min(\text{width}, \text{height})$$

where $k_2$ is a parameter obtained through intensive empirical testing, and width and height denote the image width and height.

In the B-A decision, in the step 108, the number of in-focus blocks $C_I$ are further compared to a threshold T3. If $C_I$ is less than T3, then the current image is detected as a Bokeh-Aji shot. T3 is able to be calculated as:

$$T3 = k_3 * C_O$$

where $k_3$ is a parameter obtained through intensive empirical testing.

Region of Interest Isolation

Figure 3:
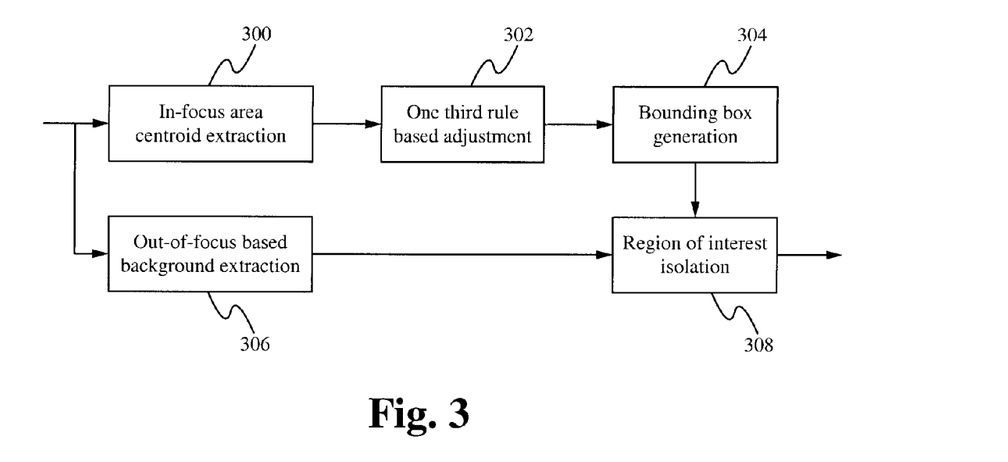
FIG. 3 illustrates a flowchart of a method of region of interest isolation according to some embodiments.

FIG. 3 illustrates a flowchart of a method of region of interest isolation according to some embodiments. In the step 300, a location centroid of the in-focus area is extracted. The centroid is calculated using the equations:

$$Centroid_{Horizontal} = \frac{1}{N} \sum_{BK(i,j) \in in\_focus} j$$

$$Centroid_{Vertical} = \frac{1}{N} \sum_{BK(i,j) \in in\_focus} i$$

The mean value of the horizontal location and the vertical location of all of the in-focus blocks is calculated.

After the centroid is obtained, one-third-rule based adjustment is used to generate the center of an initial bounding box, in the step 302. Then, a rectangle bounding box is generated to contain the in-focus area, in the step 304. In the step 306, out-of-focus based background extraction occurs. The background area within the bounding box is removed and an adjusted bounding box area is utilized as the region of interest, in the step 308.

For most pictures taken by amateur photographers, the region of interest is placed close to the center of the image. Since placing the object off-center is able to make the composition more dynamic and interesting to the eye, the best-composed photographs do not usually have their region of interest in the center. In photography, it is called the one-third rule. The one-third rule caught attention with the proportion of formatting and balancing. Therefore, it is reasonable to project that the center of the region of interest is able to be contained within an area that is bounded by a box which is one third of a total width and height from the image boundary. Based on this, the bounding box center is determined as follows:

$$W1 = (\text{width} \gg 2) + (\text{width} \gg 3)$$

$$H1 = (\text{height} \gg 2) + (\text{height} \gg 3)$$

-continued $$Center_{Horizontal} = \begin{cases} W1 & \text{if } Centroid_{Horizontal} < W1 \\ \text{width} - W1 & \text{if } Centroid_{Horizontal} > \text{width} - W1 \\ Centroid_{Horizontal} & \text{Otherwise} \end{cases}$$

$$Center_{Vertical} = \begin{cases} H1 & \text{if } Centroid_{Vertical} < H1 \\ \text{height} - H1 & \text{if } Centroid_{Vertical} > \text{height} - H1 \\ Centroid_{Vertical} & \text{Otherwise} \end{cases}$$

The bounding box width is set to be in the range of half of the picture width to two-thirds of the picture width and the bounding box height is calculated by:

$$Height_{box} = \begin{cases} W2 + 12 & \text{if } Centroid_{vertical} \geq W2 \\ 3 * \dfrac{W2}{2} & \text{Otherwise} \end{cases}$$

In some embodiments, W2=height/2.

Figure 4:
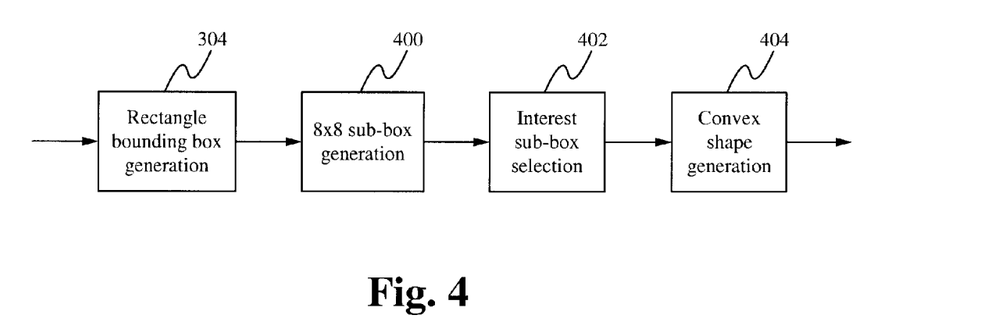
FIG. 4 illustrates a flowchart of a method of further removing a background to refine a region of interest isolation after the bounding box is generated according to some embodiments.

FIG. 4 illustrates a flowchart of a method of further removing a background to refine a region of interest isolation after the bounding box is generated according to some embodiments. In the step 400, a bounding box is separated into 8×8 sub-boxes and the number of in-focus blocks within each sub-box are counted. In the step 402, a candidate sub-box selection is applied. For each row of sub-boxes, if the number of in-focus blocks is larger or equal to 2, the sub-box is denoted as an interest sub-box. If the number of in-focus blocks is larger than 0, and one of its left neighbor sub-boxes have more than 2 in-focus blocks within it, this sub-box is denoted as an interest sub-box. Otherwise, the sub-box is denoted as a non-interest sub-box. After the sub-box selection, a convex shape is generated in the step 404. For each row of sub-boxes, the leftmost interest sub-box and the rightmost interest sub-box are found, and the sub-boxes between them are denoted as interest sub-boxes. For each column of sub-boxes, the topmost interest sub-box and bottommost interest sub-box are found, and the sub-boxes between them are denoted as interest sub-boxes. The generated convex set is the isolated region of interest.

Figure 5:
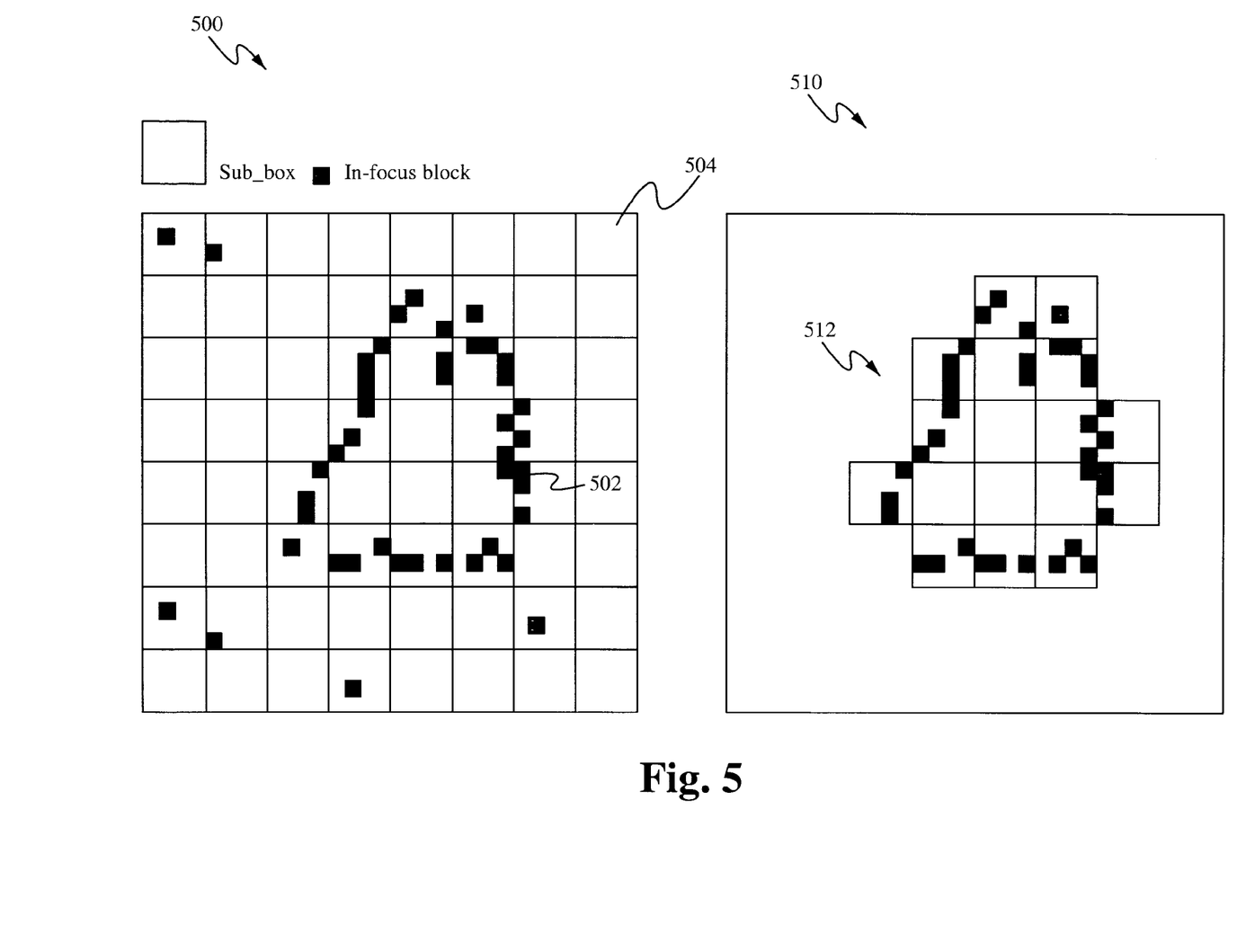
FIG. 5 illustrates a Bokeh-Aji shot based region of interest isolation process according to some embodiments.

The Bokeh-Aji shot based region of interest is illustrated in the diagram in FIG. 5. Image 500 shows in-focus blocks 502 which indicate the locations that are in-focus in the sub-boxes 504. Image 510 shows the region of interest 512 with the background cleared.

Figure 6:
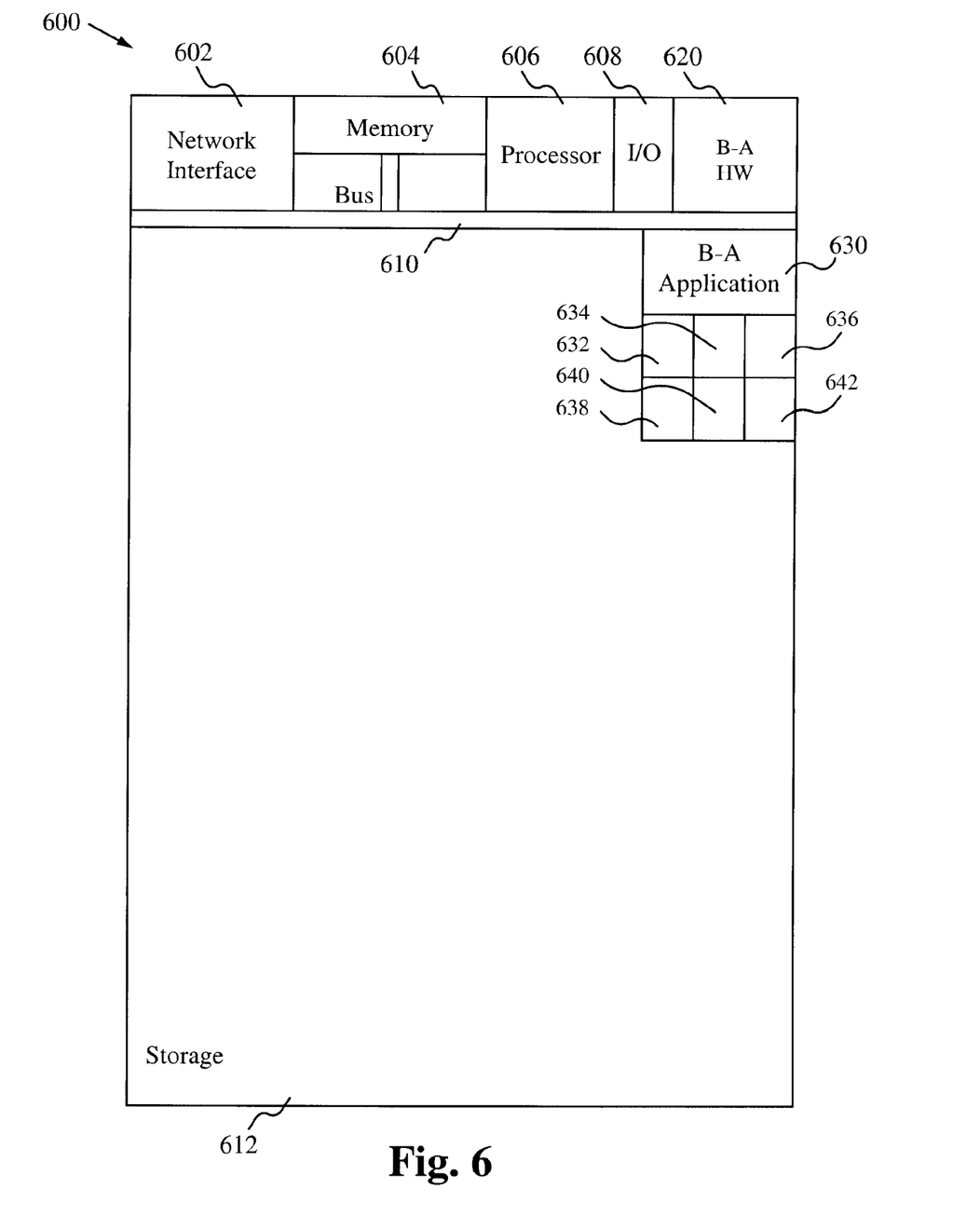
FIG. 6 illustrates a block diagram of an exemplary computing device configured to implement the "Bokeh-Aji" shot detection and region of interest isolation method according to some embodiments.

FIG. 6 illustrates a block diagram of an exemplary computing device 600 configured to implement the "Bokeh-Aji" shot detection and region of interest isolation method according to some embodiments. The computing device 600 is able to be used to acquire, store, compute, communicate and/or display information such as images and videos. For example, a computing device 600 is able to acquire and store an image. The method to detect "Bokeh-Aji" and implement region of interest isolation is able to be used when acquiring or viewing an image on the device 600. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, display, printer, modem, touchscreen, button interface and other devices. Bokeh-Aji application(s) 630 used to perform the method to detect "Bokeh-Aji" and implement region of interest isolation are likely to be stored in the storage device 612 and memory 604 and processed as applications are typically processed. More or less components shown in FIG. 6 are able to be included in the computing device 600. In some embodiments, Bokeh-Aji hardware 620 is included. Although the computing device 600 in FIG. 6 includes applications 630 and hardware 620 for Bokeh-Aji, the method to detect "Bokeh-Aji" and implement region of interest isolation is able to be implemented on a computing device in hardware, firmware, software or any combination thereof.

In some embodiments, the Bokeh-Aji application(s) 630 include several applications and/or modules. In some embodiments, the Bokeh-Aji application(s) 630 include a block SAD extraction module 632, a high pass filtering module 634, a block activity extraction module 636, a block categorization module 638, a distribution based B-A shot detection module 640 and a region of interest isolation module 642. The SAD extraction module 632 computes an SAD for each block. The high pass filtering module 634 applies high pass filtering to pixels in the blocks. The block activity extraction module 636 calculates the block activity for each block. The block categorization module 638 categorizes the blocks. The distribution based B-A shot detection module 640 determines the distribution of the blocks. The region of interest isolation module 642 isolates the region of interest. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a television, a home entertainment system or any other suitable computing device.

To utilize the method to detect "Bokeh-Aji" and implement region of interest isolation, a user displays an image such as on a digital camera, and while the image is displayed, the method to detect "Bokeh-Aji" and implement region of interest isolation automatically determines if the image is a "Bokeh-Aji" image and then implements the region of interest isolation, so that the image is displayed appropriately. The method to detect "Bokeh-Aji" and implement region of interest isolation occurs automatically without user involvement.

In operation, the method to detect "Bokeh-Aji" and implement region of interest isolation determines if an image is a "Bokeh-Aji" image. If the image is a "Bokeh-Aji" image, then region of interest isolation is implemented. By effectively integrating these tools together, the "Bokeh-Aji" images are successfully identified, and the region of interest area is successfully isolated, which is able to aid in image acquisition and editing. Isolating region of interest is able to be used in applications including, but not limited to, image indexing for content-based retrieval, object-based image compression, video object extraction and depth estimation.

Some Embodiments of "Bokeh-Aji" Shot Detection and Region of Interest Isolation

1. A method implemented on a device comprising:
   a. determining if an image includes an in-focus region of interest and an out-of-focus background using a processor; and
   b. isolating the in-focus region of interest using the processor.
2. The method of clause 1 wherein determining if the image includes the in-focus region of interest and the out-of-focus background further comprises:
   a. calculating a Sum of Absolute Differences (SAD) of each block of an image;
   b. at the same time, high pass filtering the image to obtain a high pass filter image;
   c. calculating block activity for each block in the high pass filter image;
   d. attributing each block to one of three categories: an in-focus block, an out-of-focus block and a neutral block; and
   e. deciding if the image includes the in-focus region of interest and the out-of-focus background based on the distribution of the three categories of blocks.
3. The method of clause 2 wherein deciding if the image includes the in-focus region of interest and the out-of-focus background further comprises:
   a. counting a first total amount of in-focus blocks;
   b. counting a second total amount of out-of-focus blocks;
   c. comparing the first total amount of the in-focus blocks to a first threshold;
   d. comparing the second total amount of the out-of focus blocks to a second threshold;
   e. comparing the first total amount of the in-focus blocks to a third threshold;
   f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.
4. The method of clause 1 wherein isolating the in-focus region of interest further comprises:
   a. extracting a location centroid of the in-focus region;
   b. calculating a mean value of a horizontal location and a vertical location of in-focus blocks;
   c. generating a center of an initial bounding box using one-third-rule based adjustment;
   d. generating a rectangle bounding box to contain the in-focus region;
   e. extracting an out-of-focus background;
   f. removing the out-of-focus background area within the bounding box; and
   g. utilizing an adjusted bounding box area as the region of interest.
5. The method of clause 4 wherein removing the out-of-focus background further comprises:
   a. separating the bounding box into sub-boxes;
   b. counting the in-focus blocks within each sub-box of the sub-boxes;
   c. selecting candidate sub-boxes;
   d. denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and e. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

6. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

7. A method of isolating a region of interest implemented on a device comprising:
   a. determining using a processor if an image includes an in-focus region of interest and an out-of-focus background further comprising:
      i. calculating a Sum of Absolute Differences (SAD) of each block of an image;
      ii. at the same time, high pass filtering the image to obtain a high pass filter image;
      iii. calculating block activity for each block in the high pass filter image;
      iv. attributing each block to one of three categories: an in-focus block, an out-of-focus block and a neutral block; and
      v. deciding if the image includes the in-focus region of interest and the out-of-focus background based on the distribution of the three categories of blocks; and
   b. isolating the in-focus region of interest using the processor.

8. The method of clause 7 wherein deciding if the image includes the in-focus region of interest and the out-of-focus background further comprises:
   a. counting a first total amount of in-focus blocks;
   b. counting a second total amount of out-of-focus blocks;
   c. comparing the first total amount of the in-focus blocks to a first threshold;
   d. comparing the second total amount of the out-of focus blocks to a second threshold;
   e. comparing the first total amount of the in-focus blocks to a third threshold;
   f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.

9. The method of clause 7 wherein isolating the in-focus region of interest further comprises:
   a. extracting a location centroid of the in-focus region;
   b. calculating a mean value of a horizontal location and a vertical location of in-focus blocks;
   c. generating a center of an initial bounding box using one-third-rule based adjustment;
   d. generating a rectangle bounding box to contain the in-focus region;
   e. extracting an out-of-focus background;
   f. removing the out-of-focus background area within the bounding box; and
   g. utilizing an adjusted bounding box area as the region of interest.

10. The method of clause 9 wherein removing the out-of-focus background further comprises:
    a. separating the bounding box into sub-boxes;
    b. counting the in-focus blocks within each sub-box of the sub-boxes;
    c. selecting candidate sub-boxes;
    d. denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
    e. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

11. The method of clause 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

12. A system for isolating a region of interest implemented on a device comprising:
    a. a sum of absolute differences extraction module for computing a sum of absolute differences for each block in an image using a processor;
    b. a high pass filtering module for applying high pass filtering to pixels in each of the blocks;
    c. a block activity extraction module for calculating the block activity for each of the blocks;
    d. a block categorization module for categorizing each of the blocks;
    e. a distribution based shot detection module for determining a distribution of the blocks; and
    f. a region of interest isolation module for isolating the region of interest of the image based on the distribution of the blocks.

13. The system of clause 12 wherein the distribution based shot detection module is further configured for:
    a. counting a first total amount of in-focus blocks;
    b. counting a second total amount of out-of-focus blocks;
    c. comparing the first total amount of the in-focus blocks to a first threshold;
    d. comparing the second total amount of the out-of focus blocks to a second threshold;
    e. comparing the first total amount of the in-focus blocks to a third threshold;
    f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.

14. The system of clause 12 wherein the region of interest isolation module is further configured for:
   a. extracting a location centroid of the in-focus region;
   b. calculating a mean value of a horizontal location and a vertical location of in-focus blocks;
   c. generating a center of an initial bounding box using one-third-rule based adjustment;
   d. generating a rectangle bounding box to contain the in-focus region;
   e. extracting an out-of-focus background;
   f. removing the out-of-focus background area within the bounding box; and
   g. utilizing an adjusted bounding box area as the region of interest.

15. The system of clause 14 wherein removing the out-of-focus background further comprises:
   a. separating the bounding box into sub-boxes;
   b. counting the in-focus blocks within each sub-box of the sub-boxes;
   c. selecting candidate sub-boxes;
   d. denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
   e. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

16. The system of clause 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

17. A camera device for isolating a region of interest comprising:
   a. an image acquisition component for acquiring an image;
   b. a memory for storing an application, the application for:
      i. determining if an image includes an in-focus region of interest and an out-of-focus background; and
      ii. isolating the in-focus region of interest; and
   c. a processing component coupled to the memory, the processing component configured for processing the application.

18. The camera device of clause 17 wherein determining if the image includes the in-focus region of interest and the out-of-focus background further comprises:
   a. calculating a Sum of Absolute Differences (SAD) of each block of an image;
   b. at the same time, high pass filtering the image to obtain a high pass filter image;
   c. calculating block activity for each block in the high pass filter image;
   d. attributing each block to one of three categories: an in-focus block, an out-of-focus block and a neutral block; and
   e. deciding if the image includes the in-focus region of interest and the out-of-focus background based on the distribution of the three categories of blocks.

19. The camera device of clause 18 wherein deciding if the image includes the in-focus region of interest and the out-of-focus background further comprises:
   a. counting a first total amount of in-focus blocks;
   b. counting a second total amount of out-of-focus blocks;
   c. comparing the first total amount of the in-focus blocks to a first threshold;
   d. comparing the second total amount of the out-of focus blocks to a second threshold;
   e. comparing the first total amount of the in-focus blocks to a third threshold;
   f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.

20. The camera device of clause 18 wherein isolating the in-focus region of interest further comprises:
   a. extracting a location centroid of the in-focus region;
   b. calculating a mean value of a horizontal location and a vertical location of in-focus blocks;
   c. generating a center of an initial bounding box using one-third-rule based adjustment;
   d. generating a rectangle bounding box to contain the in-focus region;
   e. extracting an out-of-focus background;
   f. removing the out-of-focus background area within the bounding box; and
   g. utilizing an adjusted bounding box area as the region of interest.

21. The camera device of clause 20 wherein removing the out-of-focus background further comprises:
   a. separating the bounding box into sub-boxes;
   b. counting the in-focus blocks within each sub-box of the sub-boxes;
   c. selecting candidate sub-boxes;
   d. denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
   e. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method implemented on a device comprising:
   a. determining if an image includes an in-focus region of interest and an out-of-focus background using a processor, wherein the determining is based on the distribution of each block of the image into one of three categories: an in-focus block, an out-of-focus block and a neutral block; and
   b. isolating the in-focus region of interest using the processor only if the image is determined to include the in-focus region of interest and the out-of-focus background.

2. A method implemented on a device comprising:
   a. determining if an image includes an in-focus region of interest and an out-of-focus background using a processor; and
   b. isolating the in-focus region of interest using the processor, wherein determining if the image includes the in-focus region of interest and the out-of-focus background further comprises:
      i. calculating a Sum of Absolute Differences (SAD) of each block of the image;
      ii. at the same time, high pass filtering the image to obtain a high pass filter image;
      iii. calculating block activity for each block in the high pass filter image;
      iv. attributing each block to one of three categories: an in-focus block, an out-of-focus block and a neutral block; and
      v. deciding if the image includes the in-focus region of interest and the out-of-focus background based on the distribution of the three categories of blocks.

3. The method of claim 2 wherein deciding if the image includes the in-focus region of interest and the out-of-focus background further comprises:
   a. counting a first total amount of in-focus blocks;
   b. counting a second total amount of out-of-focus blocks;
   c. comparing the first total amount of the in-focus blocks to a first threshold;
   d. comparing the second total amount of the out-of focus blocks to a second threshold;
   e. comparing the first total amount of the in-focus blocks to a third threshold;
   f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.

4. The method of claim 1 wherein isolating the in-focus region of interest further comprises:
   a. extracting a location centroid of the in-focus region by calculating a mean value of a horizontal location and a vertical location of in-focus blocks;
   b. generating a center of an initial bounding box using one-third-rule based adjustment;
   c. generating a rectangle bounding box to contain the in-focus region;
   d. extracting an out-of-focus background;
   e. removing the out-of-focus background area within the bounding box; and
   f. utilizing an adjusted bounding box area as the region of interest.

5. The method of claim 4 wherein removing the out-of-focus background further comprises:
   a. separating the bounding box into sub-boxes;
   b. counting the in-focus blocks within each sub-box of the sub-boxes;
   c. selecting candidate sub-boxes by,
      denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
   d. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

6. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

7. A method of isolating a region of interest implemented on a device comprising:
   a. determining using a processor if an image includes an in-focus region of interest and an out-of-focus background further comprising:
      i. calculating a Sum of Absolute Differences (SAD) of each block of an image;
      ii. at the same time, high pass filtering the image to obtain a high pass filter image;
      iii. calculating block activity for each block in the high pass filter image;
      iv. attributing each block to one of three categories: an in-focus block, an out-of-focus block and a neutral block; and
      v. deciding if the image includes the in-focus region of interest and the out-of-focus background based on the distribution of the three categories of blocks; and
   b. isolating the in-focus region of interest using the processor.

8. The method of claim 7 wherein deciding if the image includes the in-focus region of interest and the out-of-focus background further comprises:
   a. counting a first total amount of in-focus blocks;
   b. counting a second total amount of out-of-focus blocks;
   c. comparing the first total amount of the in-focus blocks to a first threshold;
   d. comparing the second total amount of the out-of focus blocks to a second threshold;
   e. comparing the first total amount of the in-focus blocks to a third threshold;
   f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.

9. The method of claim 7 wherein isolating the in-focus region of interest further comprises:
   a. extracting a location centroid of the in-focus region by calculating a mean value of a horizontal location and a vertical location of in-focus blocks;
   b. generating a center of an initial bounding box using one-third-rule based adjustment;
   c. generating a rectangle bounding box to contain the in-focus region;
   d. extracting an out-of-focus background;
   e. removing the out-of-focus background area within the bounding box; and
   f. utilizing an adjusted bounding box area as the region of interest.

10. The method of claim 9 wherein removing the out-of-focus background further comprises:
   a. separating the bounding box into sub-boxes;
   b. counting the in-focus blocks within each sub-box of the sub-boxes;
   c. selecting candidate sub-boxes by,
      denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
   d. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

11. The method of claim 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

12. A system for isolating a region of interest implemented on a device comprising:
   a. a sum of absolute differences extraction module for computing a sum of absolute differences for each block in an image using a processor;
   b. a high pass filtering module for applying high pass filtering to pixels in each of the blocks;
   c. a block activity extraction module for calculating the block activity for each of the blocks;
   d. a block categorization module for categorizing each of the blocks into one of a plurality of categories;
   e. a distribution based shot detection module for determining a distribution of the blocks within the plurality of categories; and
   f. a region of interest isolation module for isolating the region of interest of the image based on the distribution of the blocks within the plurality of categories.

13. A system for isolating a region of interest implemented on a device comprising:
   a. a sum of absolute differences extraction module for computing a sum of absolute differences for each block in an image using a processor;
   b. a high pass filtering module for applying high pass filtering to pixels in each of the blocks;
   c. a block activity extraction module for calculating the block activity for each of the blocks;
   d. a block categorization module for categorizing each of the blocks into one of a plurality of categories;
   e. a distribution based shot detection module for determining a distribution of the blocks within the plurality of categories, wherein the distribution based shot detection module is further configured for:
      i. counting a first total amount of in-focus blocks;
      ii. counting a second total amount of out-of-focus blocks;
      iii. comparing the first total amount of the in-focus blocks to a first threshold;
      iv. comparing the second total amount of the out-of focus blocks to a second threshold;
      v. comparing the first total amount of the in-focus blocks to a third threshold; and
      vi. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image; and
   f. a region of interest isolation module for isolating the region of interest of the image based on the distribution of the blocks within the plurality of categories.

14. The system of claim 12 wherein the region of interest isolation module is further configured for:
   a. extracting a location centroid of the in-focus region by calculating a mean value of a horizontal location and a vertical location of in-focus blocks;
   b. generating a center of an initial bounding box using one-third-rule based adjustment;
   c. generating a rectangle bounding box to contain the in-focus region;
   d. extracting an out-of-focus background;
   e. removing the out-of-focus background area within the bounding box; and
   f. utilizing an adjusted bounding box area as the region of interest.

15. The system of claim 14 wherein removing the out-of-focus background further comprises:
   a. separating the bounding box into sub-boxes;
   b. counting the in-focus blocks within each sub-box of the sub-boxes;
   c. selecting candidate sub-boxes by,
      denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
   d. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

16. The system of claim 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

17. A camera device for isolating a region of interest comprising:
   a. an image acquisition component for acquiring an image;
   b. a memory for storing an application, the application for:
      i. determining if an image includes an in-focus region of interest and an out-of-focus background, wherein the determining is based on the distribution of each block of the image into one of three categories: an in-focus block, an out-of-focus block and a neutral block; and
      ii. isolating the in-focus region of interest only if the image is determined to include the in-focus region of interest and the out-of-focus background; and
   c. a processing component coupled to the memory, the processing component configured for processing the application.

18. A camera device for isolating a region of interest comprising:
   a. an image acquisition component for acquiring an image;
   b. a memory for storing an application, the application for:
      i. determining if an image includes an in-focus region of interest and an out-of-focus background, wherein determining if the image includes the in-focus region of interest and the out-of-focus background further comprises:
         1. calculating a Sum of Absolute Differences (SAD) of each block of an image;
         2. at the same time, high pass filtering the image to obtain a high pass filter image;
         3. calculating block activity for each block in the high pass filter image;
         4. attributing each block to one of three categories: an in-focus block, an out-of-focus block and a neutral block; and
         5. deciding if the image includes the in-focus region of interest and the out-of-focus background based on the distribution of the three categories of blocks; and
      ii. isolating the in-focus region of interest; and
   c. a processing component coupled to the memory, the processing component configured for processing the application.

19. The camera device of claim 18 wherein deciding if the image includes the in-focus region of interest and the out-of-focus background further comprises:
   a. counting a first total amount of in-focus blocks;
   b. counting a second total amount of out-of-focus blocks;
   c. comparing the first total amount of the in-focus blocks to a first threshold;
   d. comparing the second total amount of the out-of focus blocks to a second threshold;
   e. comparing the first total amount of the in-focus blocks to a third threshold;
   f. if the first total amount of the in-focus blocks is greater than the first threshold, and if the second total amount of the out-of focus blocks is greater than the second threshold, and if the first total amount of the in-focus blocks is less than the third threshold, then the current image is detected as a Bokeh-Aji image.

20. The camera device of claim 18 wherein isolating the in-focus region of interest further comprises:
   a. extracting a location centroid of the in-focus region by calculating a mean value of a horizontal location and a vertical location of in-focus blocks;
   b. generating a center of an initial bounding box using one-third-rule based adjustment;
   c. generating a rectangle bounding box to contain the in-focus region;
   d. extracting an out-of-focus background;
   e. removing the out-of-focus background area within the bounding box; and
   f. utilizing an adjusted bounding box area as the region of interest.

21. The camera device of claim 20 wherein removing the out-of-focus background further comprises:
   a. separating the bounding box into sub-boxes;
   b. counting the in-focus blocks within each sub-box of the sub-boxes;
   c. selecting candidate sub-boxes by,
      denoting the sub-box as an interest sub-box for each row of sub-boxes, if the number of the in-focus blocks is larger or equal to 2, or if the number of the in-focus blocks is larger than 0 and one of the left neighbor sub-boxes has more than 2 in-focus blocks within; otherwise, the sub-box is denoted as a non-interest sub-box; and
   d. generating a convex shape which is set as the region of interest by finding a leftmost interest sub-box and a rightmost interest sub-box for each row of sub-boxes, and denoting sub-boxes between the leftmost interest sub-box and the rightmost interest sub-box as interest sub-boxes, and finding the topmost interest sub-box and bottommost interest sub-box for each column of sub-boxes, and denoting the sub-boxes between the topmost interest sub-box and the bottommost interest sub-box as interest sub-boxes.

* * * * *